US012577040B2

(12) United States Patent
Smith

(10) Patent No.: US 12,577,040 B2
(45) Date of Patent: Mar. 17, 2026

(54) HANDHELD TRASH COMPACTION APPARATUS

(71) Applicant: Wayne Smith, Portland, OR (US)

(72) Inventor: Wayne Smith, Portland, OR (US)

( * ) Notice: Subject to any disclaimer, the term of this patent is extended or adjusted under 35 U.S.C. 154(b) by 294 days.

(21) Appl. No.: 18/226,463

(22) Filed: Jul. 26, 2023

(65) Prior Publication Data

US 2025/0033874 A1 Jan. 30, 2025

(51) Int. Cl.

*B65F 1/16* (2006.01)
*B30B 1/00* (2006.01)
*B65F 1/14* (2006.01)

(52) U.S. Cl.

CPC ............ *B65F 1/1405* (2013.01); *B30B 1/006* (2013.01); *B65F 1/16* (2013.01); *B65F 2210/12* (2013.01)

(58) Field of Classification Search

CPC ........................... B65F 2210/12; B65F 1/1405
See application file for complete search history.

(56) References Cited

U.S. PATENT DOCUMENTS

| | | | |
|---|---|---|---|
| D672,523 S | 12/2012 | Taylor | |
| 8,584,582 B2 | 11/2013 | Johannesen | |
| 10,138,057 B2 | 11/2018 | Luo | |
| 10,661,984 B2 | 5/2020 | Chan | |
| 11,437,954 B2 * | 9/2022 | Autio | B30B 1/02 |
| 11,577,909 B2 | 2/2023 | McIntosh | |
| 2014/0137756 A1 | 5/2014 | Lee | |
| 2015/0075393 A1 * | 3/2015 | Ho | B65F 1/1405 100/245 |
| 2020/0262168 A1 | 8/2020 | Griffith | |

FOREIGN PATENT DOCUMENTS

| | | |
|---|---|---|
| WO | WO2019053674 | 3/2019 |

* cited by examiner

*Primary Examiner* — Matthew Katcoff

(57) ABSTRACT

A handheld trash compaction apparatus for compacting trash downwardly into a trash can using a portable, handheld device includes a housing lid with a handle attached thereto, a bottom press configured to fit within the housing lid, and a drive mechanism mounted within the housing lid and coupled to the bottom press. The drive mechanism is actuatable to move in a compacting direction which urges the bottom press downwardly and outwardly from the housing lid. When actuated in the compacting direction, the bottom press is configured to compact waste into the waste container. The drive mechanism is also actuatable to move in a retracting direction which urges the bottom press upwardly and inwardly toward the housing lid. When actuated in the retracting direction, the bottom press is configured for storage within the housing lid.

16 Claims, 6 Drawing Sheets

HANDHELD TRASH COMPACTION APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to trash compactors and more particularly pertains to a new trash compactor for compacting trash downwardly into a trash can using a portable, handheld device.

(2) Description of Related Art Including Information Disclosed Under 37 CFR 1.97 and 1.98

The prior art relates to trash compactors.

BRIEF SUMMARY OF THE INVENTION

An embodiment of the disclosure meets the needs presented above by generally comprising a housing lid with a handle attached thereto, a bottom press configured to fit within the housing lid, and a drive mechanism mounted within the housing lid and coupled to the bottom press. The drive mechanism is actuatable to move in a compacting direction which urges the bottom press downwardly and outwardly from the housing lid. When actuated in the compacting direction, the bottom press is configured to compact waste into the waste container. The drive mechanism is also actuatable to move in a retracting direction which urges the bottom press upwardly and inwardly toward the housing lid. When actuated in the retracting direction, the bottom press is configured for storage within the housing lid.

There has thus been outlined, rather broadly, the more important features of the disclosure in order that the detailed description thereof that follows may be better understood, and in order that the present contribution to the art may be better appreciated. There are additional features of the disclosure that will be described hereinafter, and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
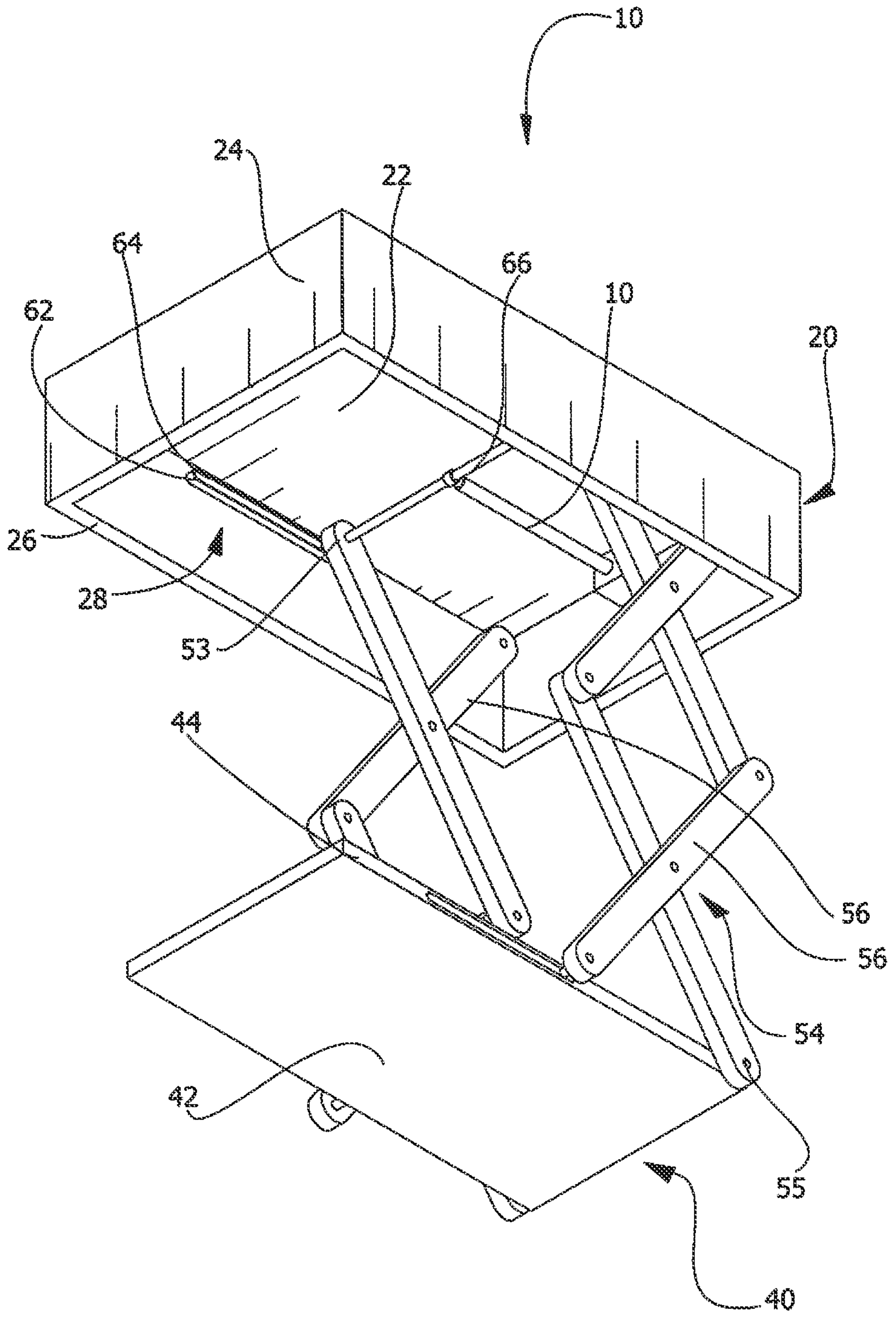
FIG. 1 is a bottom isometric view of a handheld trash compaction apparatus according to an embodiment of the disclosure.
Figure 3:
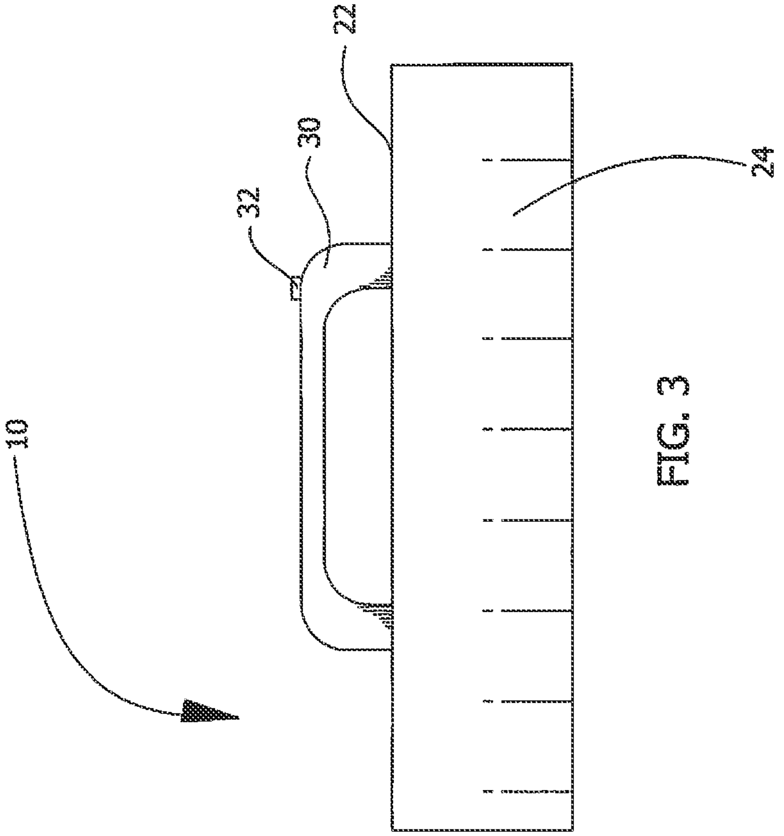
FIG. 3 is a side view of an embodiment of the disclosure.
Figure 2:
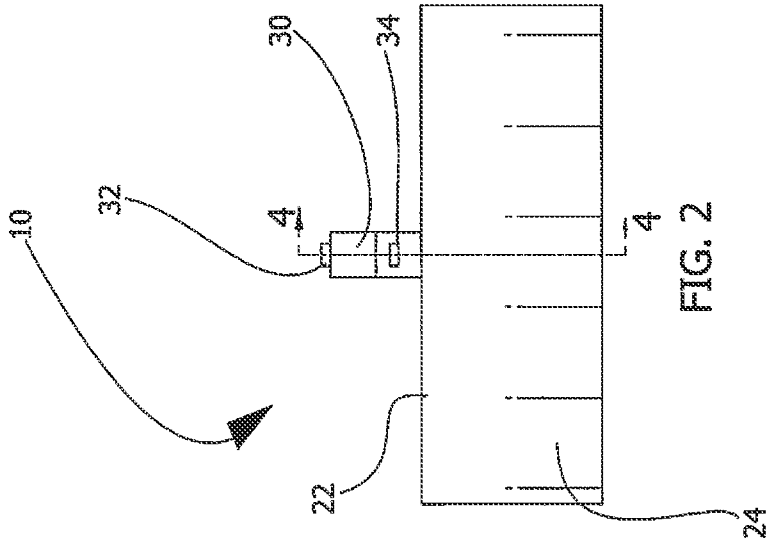
FIG. 2 is a front view of an embodiment of the disclosure.

With reference now to the drawings, and in particular to FIGS. 1 through 9 thereof, a new trash compactor embodying the principles and concepts of an embodiment of the disclosure and generally designated by the reference numeral 10 will be described.

As best illustrated in FIGS. 1 through 9, the handheld trash compaction apparatus 10 for a waste container 70 generally comprises a housing lid 20 with a handle 30 attached thereto, a bottom press 40 configured to fit within the housing lid 20, and a drive mechanism 50 mounted within the housing lid 20 and coupled to the bottom press 40. The drive mechanism 50 is actuatable to move in a compacting direction which urges the bottom press 40 downwardly and outwardly from the housing lid 20. When actuated in the compacting direction, the bottom press 40 is configured to compact waste into the waste container 70. The drive mechanism 50 is also actuatable to move in a retracting direction which urges the bottom press 40 upwardly and inwardly toward the housing lid 20. When actuated in the retracting direction, the bottom press 40 is configured for storage within the housing lid 20.

The housing lid 20 generally includes a top panel 22 and a perimeter wall 24 that is attached to and extends downwardly from the top panel 22. The perimeter wall 24 has a bottom edge 26 opposite the top panel 22. The bottom edge 26 defines an opening 28 extending into the housing lid 20. The top panel 22 has an exterior side opposite an interior side. The perimeter wall 24 also has a wall exterior side and a wall interior side.

A handle 30 is attached to the exterior side of the top panel 22. The handle 30 is configured for being gripped by a user.

A bottom press 40 is configured to fit within the opening 28 in the housing lid 20. The bottom press 40 includes a planar bottom surface 42 surrounded by a peripheral edge 44. The planar bottom surface 42 generally has a shape that is complementary to a lid shape of the top panel 22 of the housing lid 20. For example, the top panel 22 and the planar bottom surface 42 may both be rectangular. In other embodiments, the top panel 22 and the planar bottom surface 42 may both have shapes complementary to a shape of an interior space 72 of the waste container 70 with which the handheld trash compaction apparatus 10 is being used.

A drive mechanism 50 is mounted in the housing lid 20 and is coupled to the bottom press 40. The drive mechanism 50 is actuatable to move in a compacting direction to urge the bottom press 40 downwardly and outwardly from the housing lid 20. The bottom press 40 is configured to compact waste when the drive mechanism 50 is actuated in the compacting direction. The drive mechanism 50 is also actuatable to move in a retracting direction to urge the bottom press 40 upwardly and inwardly toward the housing lid 20. The bottom press 40 is configured for storage within the housing lid 20 when the drive mechanism 50 is actuated in the retracting direction.

In embodiments, the drive mechanism 50 further includes a drive motor 52 that is mounted to the housing lid 20. In the exemplary embodiments shown in FIGS. 4 and 7, the drive motor 52 may be mounted to the interior side of the top panel 22. The drive motor 52 converts electrical energy into mechanical energy which may be used to actuate the drive mechanism 50. The drive motor 52 may alternatively comprise a hydraulic motor, or other appropriate motor devices.

Figure 5:
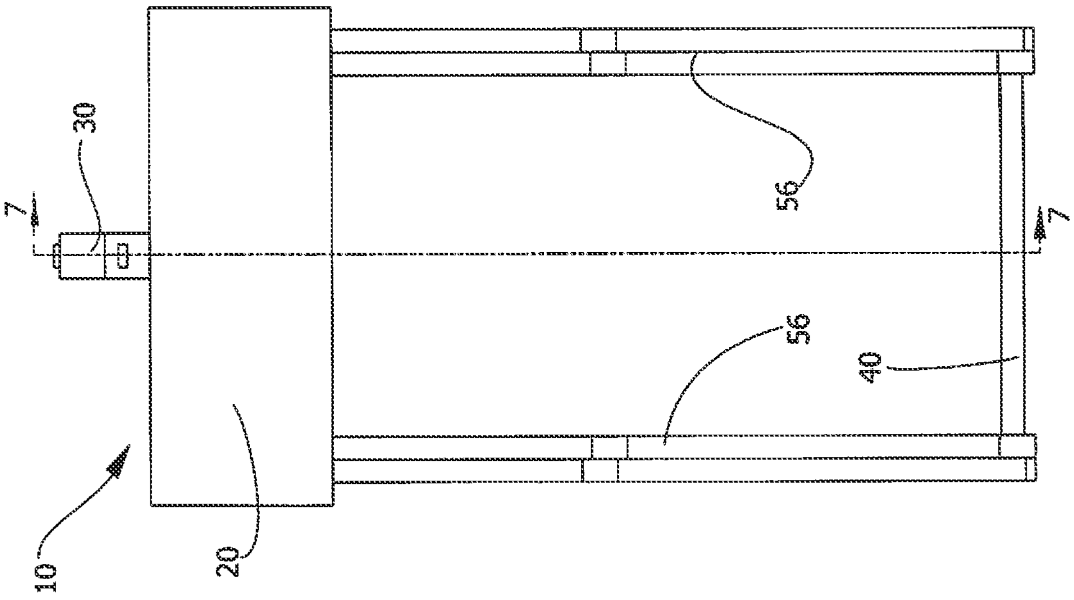
FIG. 5 is a front view of an embodiment of the disclosure.

The drive mechanism 50 may also include a lift 54 with an upper end 53 that is attached to the housing lid 20 and a lower end 55 that is attached to a top surface of the bottom press 40. In some embodiments, such as those shown in FIGS. 1 and 5, the lift 54 further includes a pair of lift arms 56. In such embodiments, each of the pair of lift arms 56 has an upper end 53 that attached to the housing lid 20 and a lower end 55 that is attached to the peripheral edge 44 of the bottom press 40. In these embodiments, the pair of lift arms 56 may be laterally displaced with respect to one another across the top panel 22 of the housing lid 20 and across the planar bottom surface 42 of the bottom press 40. The embodiment shown in FIG. 5 depicts a pair of scissor lift arms 56, but other lift arms 54 may be used, such as accordion lift arms or telescoping arms. The type of lift arms 54 may be chosen to optimize functionality based on the type of motor or power source that are used to actuate the drive mechanism 50. For example, some lift arms 54 may operate better with an electrical drive motor 52, while other lift arms 54 may operate better with a hydraulic drive motor. Different embodiments may include different combinations of power supplies 36 and lifts 54. For the sake of brevity, the present disclosure only includes figures with a drive motor 52 and scissor lift arms 54, but that is not intended as a limitation of the disclosed embodiments.

Figure 4:
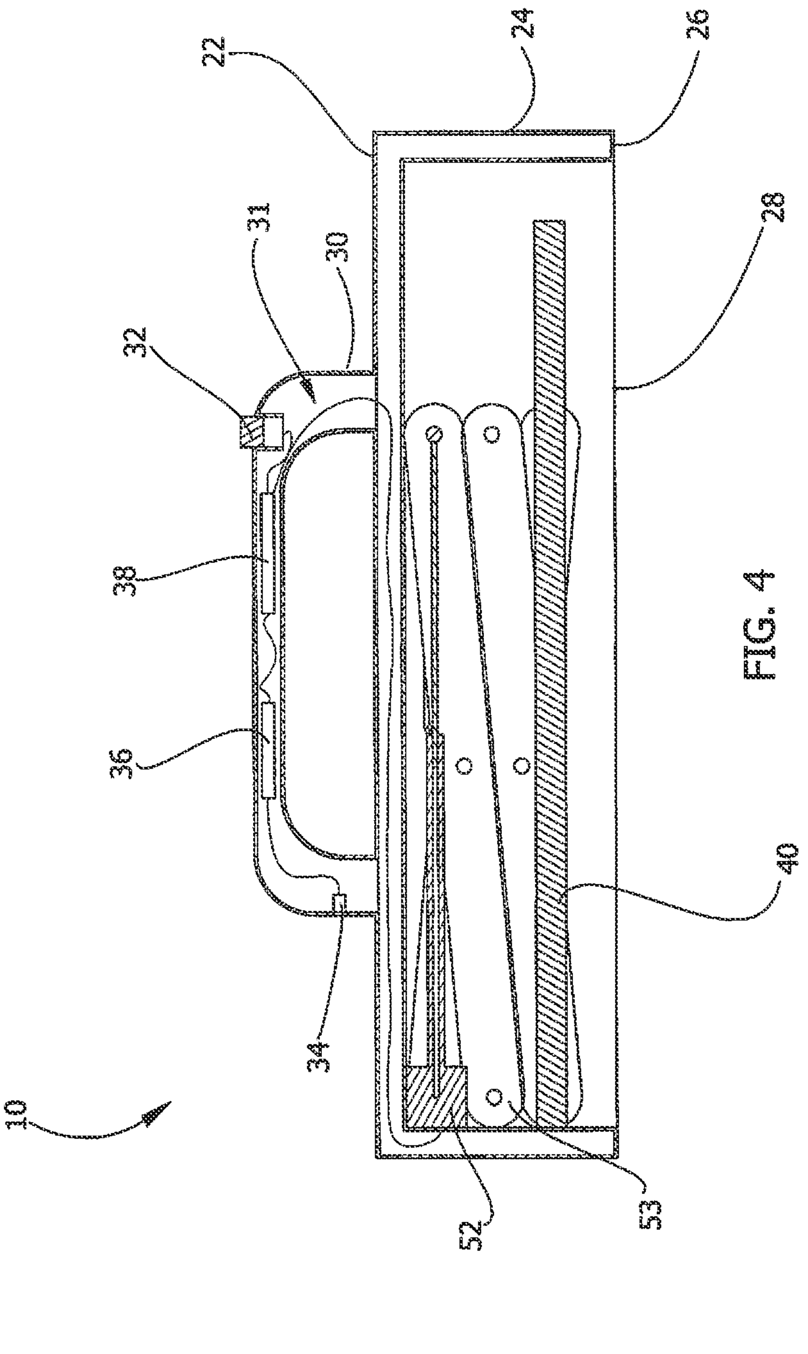
FIG. 4 is a cross-sectional view of an embodiment of the disclosure.
Figure 6:
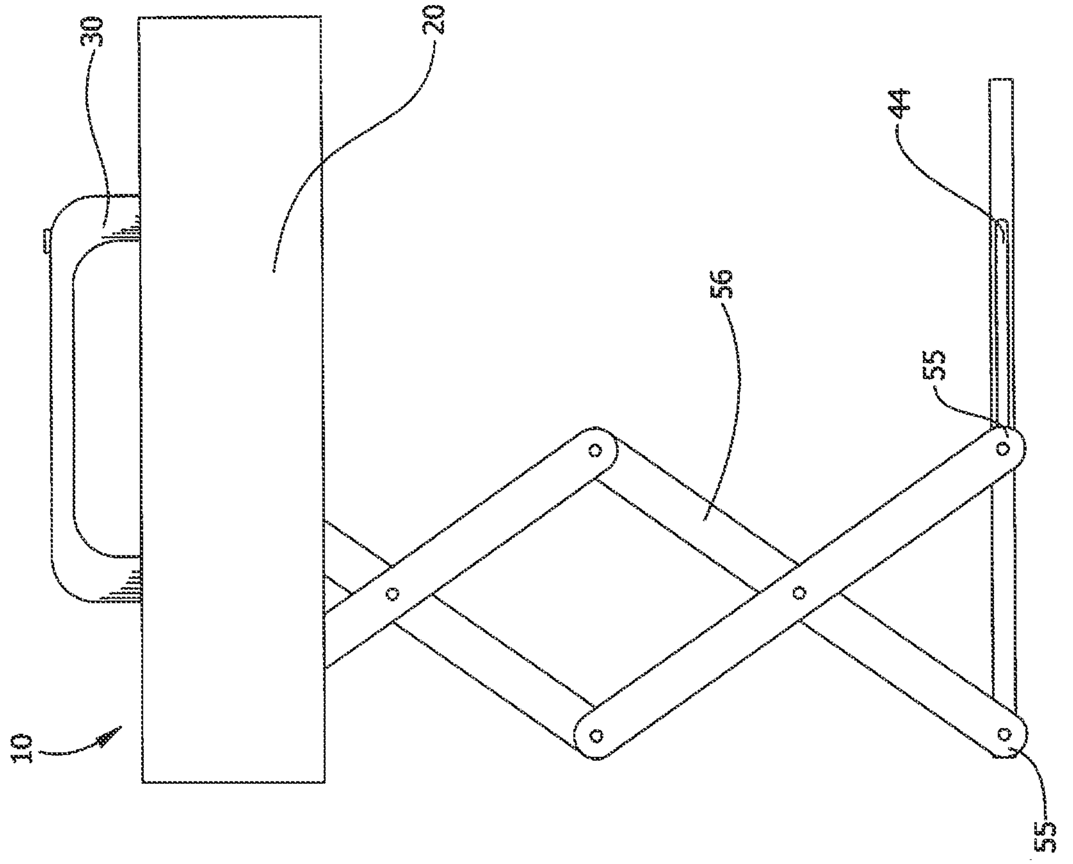
FIG. 6 is a side view of an embodiment of the disclosure.
Figure 7:
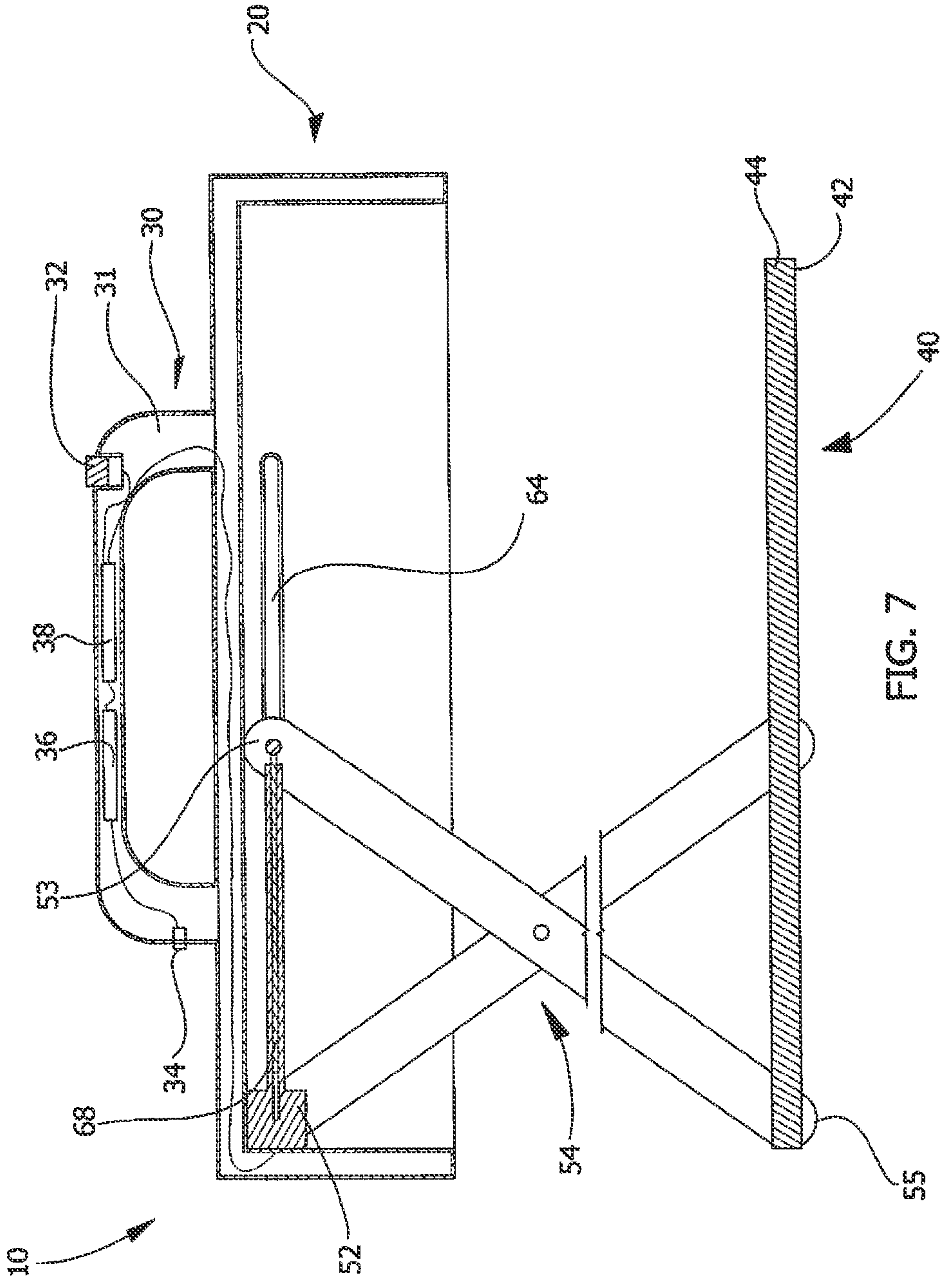
FIG. 7 is a cross-sectional view of an embodiment of the disclosure.

The drive mechanism 50 may further include a drive shaft 60 that is coupled to the drive motor 52 and to the lift 54. For example, as shown in FIGS. 1 and 7, the drive shaft 60 may include a deploying rod track 62 affixed to the interior side of the perimeter wall 24 adjacent to the top panel 22. The deploying rod track 62 may have a pair of parallel slots 64 formed in complementary sides of the perimeter wall 24. The pair of parallel slots 64 define a track length along which a deploying rod 66 travels. The deploying rod 66 is slidably attached to the deploying rod track 62 and extends between the pair of parallel slots 64. The upper end 53 of the lift 54 may be affixed to the deploying rod track 62 and configured to slide along the deploying rod track 62 with the deploying rod 66. A deployment lever 68 is generally affixed to the perimeter wall 24. For example, the deployment lever 68 may be perpendicularly connected with the deploying rod 66. The deployment lever 68 is configured to extend when the drive motor 52 is actuated in the compacting direction and to retract when the drive motor 52 is actuated in the retracting direction. For example, as shown in FIGS. 4 and 7, the deployment lever 68 may use a telescoping deployment arm having nested poles that extend relative to each other in a linear direction. Alternative embodiments of the deployment lever 68 may also be appropriate, as long as the deployment lever 68 urges the deploying rod 66 along the track length of the deploying rod track 62.

The drive mechanism 50 may also include a power supply 36 electrically coupled to the drive motor 52. For example, the power supply 36 may comprise a USB charging port 34 or an AC power cord 34. In embodiments, a switch 32 is electrically coupled to the power supply 36 to actuate the drive motor 52 in the compacting direction or the retracting direction. For example, as shown in FIGS. 2-9, the switch 32 may be externally affixed to the handle 30.

The handle 30 may further include an interior handle space 31 therein extending through the handle 30. A number of components may be housed in the interior handle space 31. For example, as depicted in FIGS. 4 and 7, the interior handle space 31 may house a charging port 34, a battery 36, and a circuit board 38. The charging port 34 may be positioned in the interior handle space 31 and is generally electrically coupled to the power supply 36. In embodiments, at least a portion of the charging port 34 is accessible from the exterior of the handle 30. The charging port 34 is generally configured to receive a charging cable, such as a USB charging cable or an AC charging cable. Please note that alternative charging cables may also be appropriately used. The battery 36 is positioned in the interior handle space 31. The battery 36 is electrically coupled to the charging port 34. The circuit board 38 positioned in the interior handle space 31 is electrically coupled to the battery 36, the switch 32, and the drive motor 52.

Figure 9:
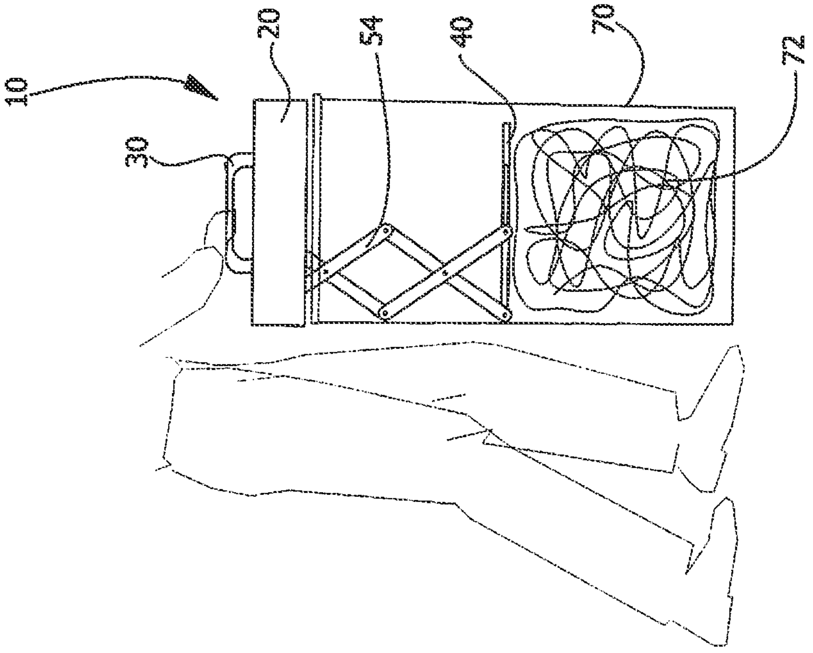
FIG. 9 is an in-use view of an embodiment of the disclosure.
Figure 8:
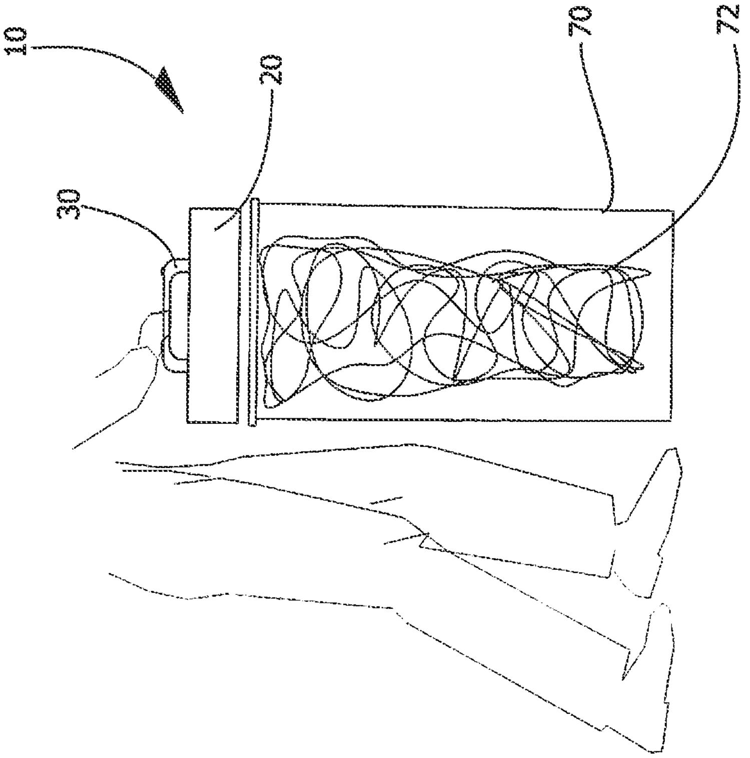
FIG. 8 is an in-use view of an embodiment of the disclosure.

An exemplary in-use embodiment is shown in FIGS. 8 and 9. As shown, the trash compaction system 10 comprises a waste container 70, a housing lid 20, a handle attached to the exterior side of the top panel 22, a bottom press 40 configured to fit within the opening 28 in the housing lid 20. A drive mechanism 50 is mounted in the housing lid 20 and is coupled to the bottom press 40. As shown, the waste container 70 has an interior space 72 that is complimentary to the shape of the bottom press 40. The opening 28 of the housing lid 20 may also have an interior lid space that is complementary to the shape of the bottom press 40. The embodiments depicted in FIGS. 8 and 9 show the interior space 72, shape of the bottom press 40, and interior lid space are generally rectangular, but alternative embodiments may include alternatively shaped elements configured appropriately for use in alternatively shaped waste containers 70. A user may press the switch 32 affixed to the handle 30, actuating the drive motor 52 in the compacting direction to urge the bottom press 40 downwardly and outwardly from the housing lid 20. The bottom press 40 pushes the waste within the interior space 72 downward, compacting it into a smaller volume. Then, the user may press the switch 32 a second time to actuate the drive motor 52 in the retracting direction, urging the bottom press 40 back upwardly and inwardly toward the storage position within the housing lid 20. Alternatively, the drive motor 52 may automatically actuate in the retracting direction, for example after a certain amount of time. The battery 36 may store a certain charge of amount of power for the drive motor 52. Alternatively, the power supply 36 may be a power chord configured to be permanently affixed to the trash compaction system 10 and further configured to be plugged into an external battery or wall outlet.

The embodiments depicted in FIGS. 8 and 9 resemble a household trashcan or waste container 70. However, other embodiments may be appropriately sized and configured for use in larger or smaller waste containers 70. For example, one embodiment may be smaller, for use in a 1-gallon to 3-gallon waste container 70 which may be found under a desk or in a bathroom. Another embodiment may be larger, for use in a waste container 70 which may be found outdoors, for example holding yard waste. Some embodiments may even be large enough to be used with the large 65-gallon to 95-gallon outdoor trash cans.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements are present, unless the context clearly requires that there be only one of the elements.

I claim:

1. A handheld press assembly configured to compact trash downwardly into a waste container, the handheld press assembly comprising:

a housing lid including a top panel and a perimeter wall being attached to and extending downwardly from the top panel, the perimeter wall having a bottom edge opposite the top panel, the bottom edge defining an opening extending into the housing lid, the top panel having an exterior side opposite an interior side, the perimeter wall having a wall exterior side and a wall interior side;

a handle being attached to the exterior side of the top panel, the handle being configured for being gripped by a user;

a bottom press being configured to fit within the opening in the housing lid; and a drive mechanism being mounted in the housing lid and being coupled to the bottom press, the drive mechanism being actuatable to move in a compacting direction to urge the bottom press downwardly and outwardly from the housing lid, wherein the bottom press is configured to compact waste when the drive mechanism is actuated in the compacting direction, the drive mechanism being actuatable to move in a retracting direction to urge the bottom press upwardly and inwardly toward the housing lid, wherein the bottom press is configured for storage within the housing lid when the drive mechanism is actuated in the retracting direction, the drive mechanism including a drive motor being mounted to the housing lid;

a lift having an upper end attached to the housing lid and a lower end being attached to a top surface of the bottom press;

a drive shaft being coupled to the drive motor and to the lift;

a power supply being electrically coupled to the drive motor; and a switch being electrically coupled to the power supply to actuate the drive motor in the compacting direction or the retracting direction.

2. The handheld press assembly of claim 1, the bottom press further comprising:

a planar bottom surface being surrounded by a peripheral edge.

3. The handheld press assembly of claim 2, the planar bottom surface having a shape being complementary to a lid shape of the top panel of the housing lid.

4. The handheld press assembly of claim 3, wherein the top panel and the planar bottom surface are rectangular.

5. The handheld press assembly of claim 1, the lift further comprising:

a pair of lift arms, wherein each of the pair of lift arms has an upper end being attached to the housing lid and a lower end being attached to the peripheral edge of the bottom press.

6. The handheld press assembly of claim 5, wherein the pair of lift arms are laterally displaced with respect to one another across the top panel of the housing lid and across the planar bottom surface of the bottom press.

7. The handheld press assembly of claim 1, the drive shaft further comprising:

a deploying rod track being affixed to the interior side of the perimeter wall adjacent to the top panel, the deploying rod track having a pair of parallel slots formed in complementary sides of the perimeter wall, the pair of parallel slots defining a track length;

the upper end of the lift being affixed to the deploying rod track;

a deploying rod being slidably attached to the deploying rod track, the deploying rod extending between the pair of parallel slots; and a deployment lever being affixed to the perimeter wall and being perpendicularly connected with the deploying rod, the deployment lever being configured to extend when the drive motor is actuated in the compacting direction and to retract when the drive motor is actuated in the retracting direction.

8. The handheld press assembly of claim 1, wherein the lift is a scissor lift.

9. The handheld press assembly of claim 8, the scissor lift further comprising a pair of scissor lift arms laterally displaced across the bottom press from one another.

10. The handheld press assembly of claim 1, wherein the switch is affixed to the handle.

11. The handheld press assembly of claim 10, the handle having an interior handle space therein extending through the handle, the handle further comprising:

a charging port being positioned in the interior handle space, the charging port being electrically coupled to the power supply, at least a portion of the charging port being accessible from an exterior of the handle and being configured to receive a charging cable;

the power supply being a battery being positioned in the interior handle space, the battery being electrically coupled to the charging port; and a circuit board being positioned in the interior handle space, the circuit board being electrically coupled to the battery, the switch, and the drive motor.

12. The handheld press assembly of claim 11, wherein the charging port is configured to receive a USB charging cable.

13. The handheld press assembly of claim 11, wherein the charging port is configured to receive an AC charging cable.

14. The handheld press assembly of claim 1, the power supply further comprising a USB charging port.

15. The handheld press assembly of claim 1, the power supply further comprising an AC power cord.

16. A trash compaction system comprising:

a waste container;

a housing lid including a top panel and a perimeter wall being attached to and extending downwardly from the top panel, the perimeter wall having a bottom edge opposite the top panel, the bottom edge defining an opening extending into the housing lid, the top panel having an exterior side opposite an interior side, the perimeter wall having a wall exterior side opposite a wall interior side;

a handle being attached to the exterior side of the top panel, the handle being configured for being gripped by a user;

a bottom press being configured to fit within the opening in the housing lid, the bottom press having a planar bottom surface being surrounded by a peripheral edge, the planar bottom surface and the peripheral edge defining a shape of the bottom press, the shape being rectangular;

a drive mechanism being mounted in the housing lid and being coupled to the bottom press, the drive mechanism being actuatable to move in a compacting direction to urge the bottom press downwardly and outwardly from the housing lid, wherein the bottom press is configured to compact waste when the drive mechanism is actuated in the compacting direction, the drive mechanism being actuatable to move in a retracting direction to urge the bottom press upwardly and inwardly toward the housing lid, wherein the bottom press is configured for storage within the housing lid when the drive mechanism is actuated in the retracting direction;

the waste container having an interior space being complimentary to the shape of the bottom press;

the opening of the housing lid having an interior lid space being complementary to the shape of the bottom press;

the drive mechanism including:

a drive motor being mounted to the housing lid;

a lift having an upper end attached to the housing lid and a lower end being attached to a top surface of the bottom press, the lift including:

a pair of scissor lift arms, wherein each of the pair of scissor lift arms has an upper end being attached to the interior lid space and a lower end being attached to the peripheral edge, the pair of scissor lift arms being laterally displaced with respect to one another across the planar bottom of the bottom press and across the top panel of the housing lid;

a drive shaft being coupled to the drive motor and to the lift, the drive shaft including:

a deploying rod track being affixed to the interior side of the perimeter wall adjacent to the top panel, the deploying rod track having a pair of parallel slots formed in complementary sides of the perimeter wall, the pair of parallel slots defining a track length;

the upper end of each of the pair of scissor lift arms being affixed to each of the parallel slots of the deploying rod track;

a deploying rod being slidably attached to the deploying rod track, the deploying rod extending between the pair of parallel slots;

a deployment lever being affixed to the perimeter wall and being perpendicularly connected with the deploying rod, the deployment lever being configured to extend when the drive motor is actuated in the compacting direction and to retract when the drive motor is actuated in the retracting direction;

a power supply being electrically coupled to the drive motor;

a switch being electrically coupled to the power supply to actuate the drive motor in the compacting direction or the retracting direction, the switch being affixed to the handle;

the handle having an interior handle space therein extending through the handle, the interior handle space including:

a USB charging port being positioned in the interior space of the handle, the USB charging port being electrically coupled to the power supply, at least a portion of the USB charging port being accessible from an exterior of the handle and being configured to receive a USB charging cable;

the power supply being a battery being positioned in the interior space of the handle, the battery being electrically coupled to the charging port; and a circuit board being positioned in the interior space of the handle, the circuit board being electrically coupled to the battery, the switch, and the drive motor.

* * * * *